United States Patent
Song et al.

(10) Patent No.: US 8,700,598 B2
(45) Date of Patent: Apr. 15, 2014

(54) MANUAL SEARCH METHOD AND IMAGE DISPLAY DEVICE USING THE SAME

(75) Inventors: Jeom Ki Song, Gyeonggi-do (KR); Jae Woo Jo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 444 days.

(21) Appl. No.: 12/537,638

(22) Filed: Aug. 7, 2009

(65) Prior Publication Data

US 2010/0063979 A1   Mar. 11, 2010

(30) Foreign Application Priority Data

Aug. 8, 2008 (KR) .................. 10-2008-0078039

(51) Int. Cl.
  *G06F 17/30* (2006.01)
(52) U.S. Cl.
  USPC ......................................... 707/708; 707/758
(58) Field of Classification Search
  None
  See application file for complete search history.

(56) References Cited

U.S. PATENT DOCUMENTS

| | | | | |
|---|---|---|---|---|
| 5,710,898 A | * | 1/1998 | Tozuka | 715/708 |
| 6,456,303 B1 | * | 9/2002 | Walden et al. | 715/705 |
| 7,333,939 B1 | * | 2/2008 | Stender et al. | 705/4 |
| 2002/0077844 A1 | * | 6/2002 | Hayashi | 705/1 |
| 2004/0001703 A1 | * | 1/2004 | Kang | 386/95 |
| 2004/0201867 A1 | * | 10/2004 | Katano | 358/1.15 |
| 2006/0005221 A1 | * | 1/2006 | MacBeth et al. | 725/47 |
| 2006/0080607 A1 | * | 4/2006 | Cohen et al. | 715/705 |
| 2006/0257025 A1 | * | 11/2006 | Simmons et al. | 382/186 |
| 2007/0011612 A1 | * | 1/2007 | Takemura | 715/705 |
| 2007/0150562 A1 | * | 6/2007 | Stull et al. | 709/223 |
| 2008/0201319 A1 | * | 8/2008 | McNamar | 707/5 |

* cited by examiner

*Primary Examiner* — Son T Hoang

(74) *Attorney, Agent, or Firm* — Birch, Stewart, Kolasch & Birch, LLP

(57) ABSTRACT

A method and apparatus for searching a manual in an image display device includes a display unit, a key input unit and a control unit. In the method, a menu call command for setting a function of an image display device is input at the request of a user. Menu items for the function setting are displayed. One of the items is selected, and a predetermined key is input for a manual call command for the item. A manual page of the selected item is displayed.

16 Claims, 5 Drawing Sheets

MANUAL SEARCH METHOD AND IMAGE DISPLAY DEVICE USING THE SAME

CROSS-REFERENCE TO RELATED APPLICATIONS

The present application claims priority under 35 U.S.C. 119 and 35 U.S.C. 365 to Korean Patent Application No. 10-2008-0078039 (filed on 8 Aug., 2008), which is hereby incorporated by reference in its entirety.

BACKGROUND

The present disclosure relates to an image display device, and more particularly, to a method for searching a manual in an image display device.

Recently, various video/audio devices such as image display devices are providing realistic video and audio, and other devices with various functions are being popularized.

Particularly, to provide digital images, image display devices such as TVs and monitors require various functions for meeting the states and demands of users.

In the related art, manufacturers provide manual books or files (e.g., CDs) in order to provide the descriptions about various functions of image display devices so that users can personally set the functions. However, the users are inconvenienced in using the manuals and are inconvenienced by having to well keep the manuals so as not to lose the manuals.

Also, the manufacturers have to provide manuals corresponding to image display devices sold/provided to worldwide countries. Thus, the manufacturers have to expend much time and money in making/distributing the manuals of various languages.

Accordingly, the user is inconvenienced by having to search the manual by means of a separate device or book or through a table of contents or a sequential search in order to read a specific manual page.

SUMMARY

Embodiments provide facilitating a search for a manual provided in an image display device.

Embodiments also provide making it possible to variously search a manual provide in an image display device.

In one embodiment, a method for searching a manual in an image display device comprises: displaying function setting menu items for functions of an image display device; receiving one of the displayed menu items from a user; and displaying a manual page corresponding to the selected menu item.

In another embodiment, an image display device comprises: a memory unit storing a manual including a plurality of pages; a display unit displaying a manual page and function setting menu items for functions of the image display device; a key input unit receiving a manual request for one of the menu items from a user; and a control unit searching a manual page corresponding to the selected menu item in response to the manual request, and displaying the searched manual page on the display unit.

The manual search method may be implemented using a computer-readable recording medium that stores a program for executing the manual search method on a computer.

The details of one or more embodiments are set forth in the accompanying drawings and the description below. Other features will be apparent from the description and drawings, and from the claims.

DETAILED DESCRIPTION OF THE EMBODIMENTS

Hereinafter, the embodiments of the present disclosure will be described in detail with reference to the accompanying drawings.

Figure 1:
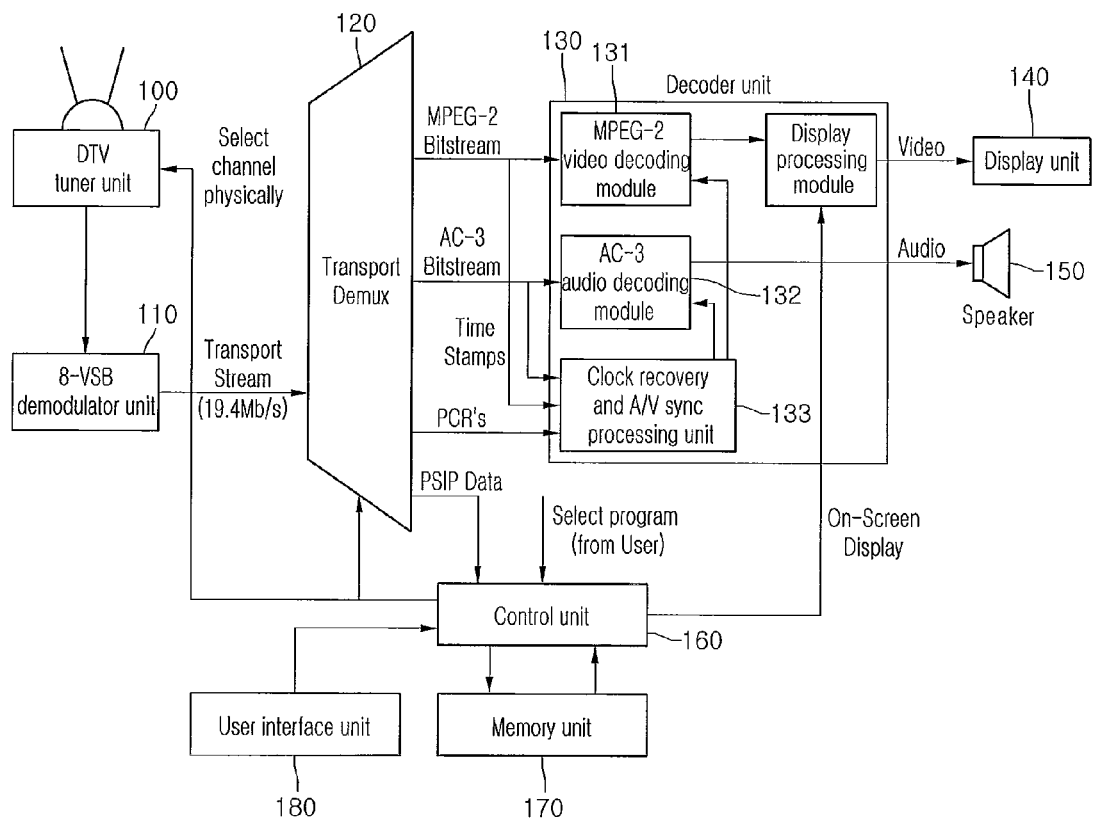
FIG. 1 is a block diagram of an image display device according to an embodiment.

FIG. 1 is a block diagram of an image display device according to an embodiment.

Referring to FIG. 1, an image display device may include: a tuner unit 100 selecting a specific channel physically and receiving a digital broadcast signal of a transport stream format in the selected channel; a demodulator unit 110 demodulating the transport stream received from the tuner unit 100; a transport demultiplexer (Demux) unit 120 demultiplexing the demodulated transport stream into a video bit stream, an audio bit stream, and Program and System Information Protocol (PSIP) data; and a decoder unit 130 decoding the respective signals demultiplexed by the transport demultiplexer unit 120 to output video/audio signals.

The decoder unit 130 may include: a video decoding module 131 decoding a video bit stream into a video signal; an audio decoding module 132 decoding an audio bit stream into an audio signal; an A/V sync signal processing unit 133 processing the clock recovery and A/V sync signals of the video decoding module and the audio decoding module by receiving time stamp signals from the video/audio bit streams; and a display processing module 134 converting the video signal decoded by the video decoding module into a displayable video output format. The display processing module 134 has a scaling function to scale various aspect ratios such as 4:3, 16:9, Zoom, Wide, or spectacle.

The image display device may further include a display unit 140 that displays a vide signal. The display unit 140 displays an On Screen Display (OSD) screen required to set the function of the image display device at the request of a user, and displays a manual for an item selected by a user in the OSD screen. According to an embodiment, when a manual page for a selected OSD is to be displayed, the display unit 140 divides the screen vertically or horizontally to display an OSD item in a first region and display a manual page of the OSD in a second region.

Thus, the display unit 140 may convert and display a manual page displayed in the second region according to an item inputted from the user with respect to a displayed OSD item.

Also, the image display device may further include: a speaker 150 outputting an audio signal; and a control unit 160 outputs channel/program selection signals to the tuner unit 100 and the demodulator unit 110 according to the user's program selection and the PISP data outputted from the transport demultiplexer 120.

The image display device may further include a memory unit 170 that stores various language data and at least one image to be displayed in the manual, and stores the location information of language data and an image of the manual to be displayed according to a control signal of the control unit when a manual display request signal is inputted. The memory unit 170 may store index information by classifying the same into categories for displaying the manual according to a function setting OSD item.

Also, the memory unit 170 may store a manual including a plurality of pages, and may store information about each of the manual pages, for example, a keyword for the content of each manual page.

Accordingly, when a manual request for a specific function setting menu item is inputted from the user, the control unit 160 may search the inputted menu item or the manual page corresponding to the specific function in the memory unit 170 and output the same to the display unit 140.

Also, the control unit 160 may search a manual page corresponding to a menu item or function desired by the user, by using a keyword for each manual page stored in the memory unit 170.

The image display unit may further include a user interface unit 180. For example, the user interface unit 180 may be a remote controller capable of receiving a control signal from the outside, or may be a local device provided in the image display device. According to an embodiment, the user interface unit 180 may be configured to set various functions of the image display device, or receive an OSD menu call signal for the function setting from the user.

Also, it performs a function of inputting a specific key for a manual call command or a separate key for a manual call command for displaying a manual with respect to an item selected by the user according to an OSD menu.

Hereinafter, the operation of an embodiment according to the aforesaid configuration of the image display device will be described in detail with reference to FIGS. 2 to 5.

Figure 2:
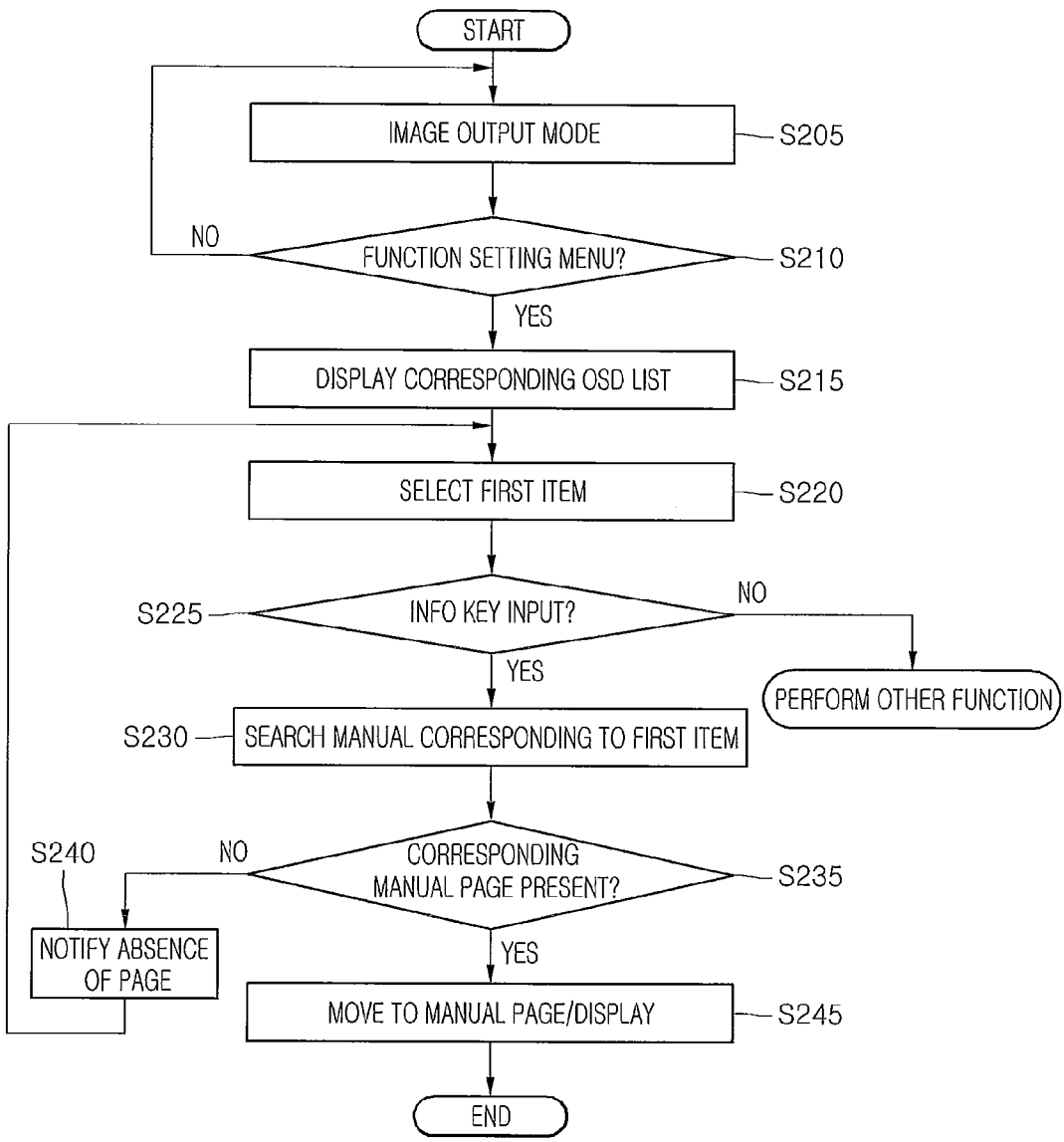
FIG. 2 is a flow chart illustrating a manual search method according to an embodiment.

FIG. 2 is a flow chart illustrating a manual search method according to an embodiment. The manual search method illustrated in FIG. 2 will be described in association with the block diagram of FIG. 1.

Although the embodiment illustrates that an image output mode is performed in an initial operation of the image display device, a predetermined function mode among various other function modes of the image display device may be performed.

Referring to FIG. 2, the control unit 160 of the image display device performs an image output mode of outputting various videos and audios, received through the tuner unit 100, through the display unit 140 and the speaker 150 (S205).

When detecting the input of a control signal through the user interface unit 180 in the image output mode, the control unit 160 determines whether the image display device has received a function setting menu call for setting various functions. If detecting the input of a call command signal of a menu for setting various functions of the image display device, the control unit 160 displays the corresponding OSD list on the display unit 140 (S215).

Figure 3:
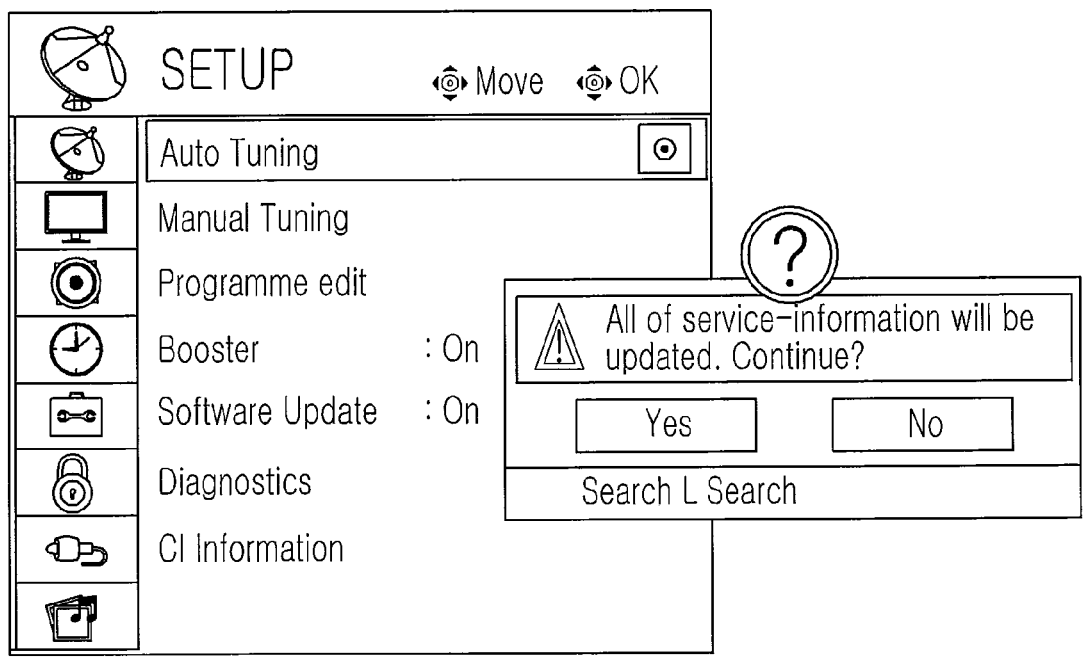
FIG. 3 is a diagram illustrating an embodiment of a screen for displaying function setting menu items in an image display device.

FIG. 3 is a diagram illustrating an embodiment of a screen for displaying function setting menu items in an image display device.

Referring to FIG. 3, a menu for setting each of the functions is displayed as described above, and the menu may include function setting menu items for setting the respective functions.

The control unit 160 receives a first item selected among various displayed OSD items by the user (S220), and determines whether an information key requesting the display of a manual page for the selected item is inputted (S225). If detecting the information key, the control unit 160 checks an OSD item that is currently selected by the user (S230), and determines whether the corresponding item is present in the category stored in the memory unit 170 (S236).

If the corresponding page of the manual for the OSD item selected by the user is not present, the control unit 160 displays an OSD notifying the absence of the corresponding manual page (S240).

On the other hand, if the corresponding page of the manual is present, the control unit 160 moves to the corresponding page to display the page corresponding to the OSD selected by the user (S245).

In this case, a pop-up window asking whether to move the manual page corresponding to the function setting menu item selected by the user may be displayed as illustrated in FIG. 3.

To display the manual, the screen of the display unit 140 may be divided vertically or horizontally so that the OSD item can be displayed in the first region and the manual page for the OSD item selected by the user can be displayed in the second region.

Figure 4:
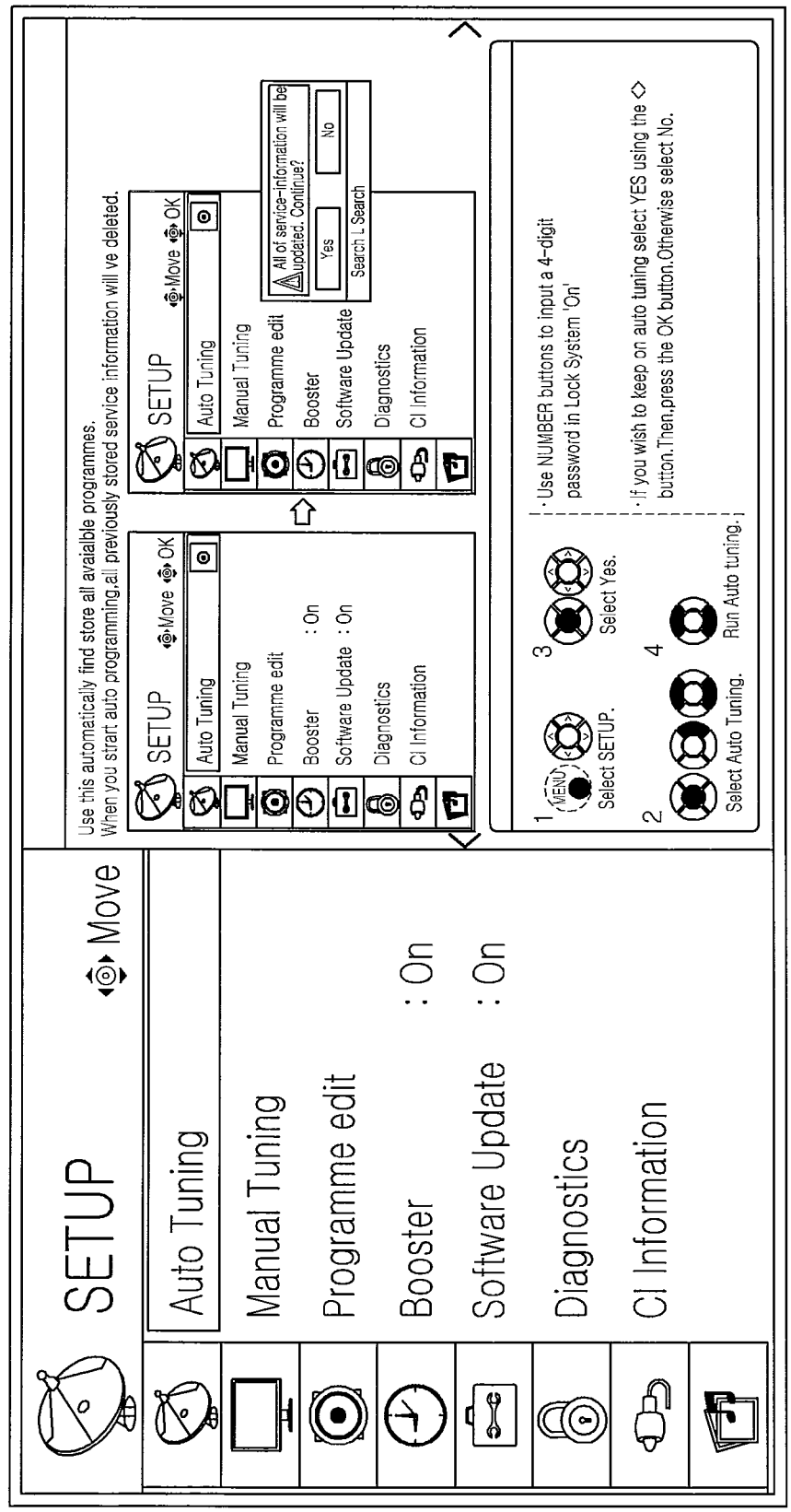
FIG. 4 is a diagram illustrating an embodiment of a screen for displaying a manual page in an image display device.

FIG. 4 is a diagram illustrating an embodiment of a screen for displaying a manual page in an image display device.

Referring to FIG. 4, the display screen may be divided horizontally as described above, so that a plurality of menu items for setting a function may be displayed in the left first region and a manual page corresponding to a menu item selected among the menu items by the user may be in the right second region.

Also, if the manual page for the OSD item selected by the user is plural, the control unit 160 may display a notification text notifying the plurality of the manual page and display the corresponding page corresponding to the input of the navigation key of the user interface unit.

That is, the control unit 160 may search the manual page corresponding to the function setting item selected by the user in the memory unit 170, and two or more pages corresponding to the item may be present in the manual stored in the memory unit 170.

As described above, the OSD item is displayed in the first region and the manual page for the selected OSD item is displayed in the second region. Accordingly, when the second OSD item is selected from the OSD item display region by the user, the corresponding manual page can be displayed in the second region.

Figure 5:
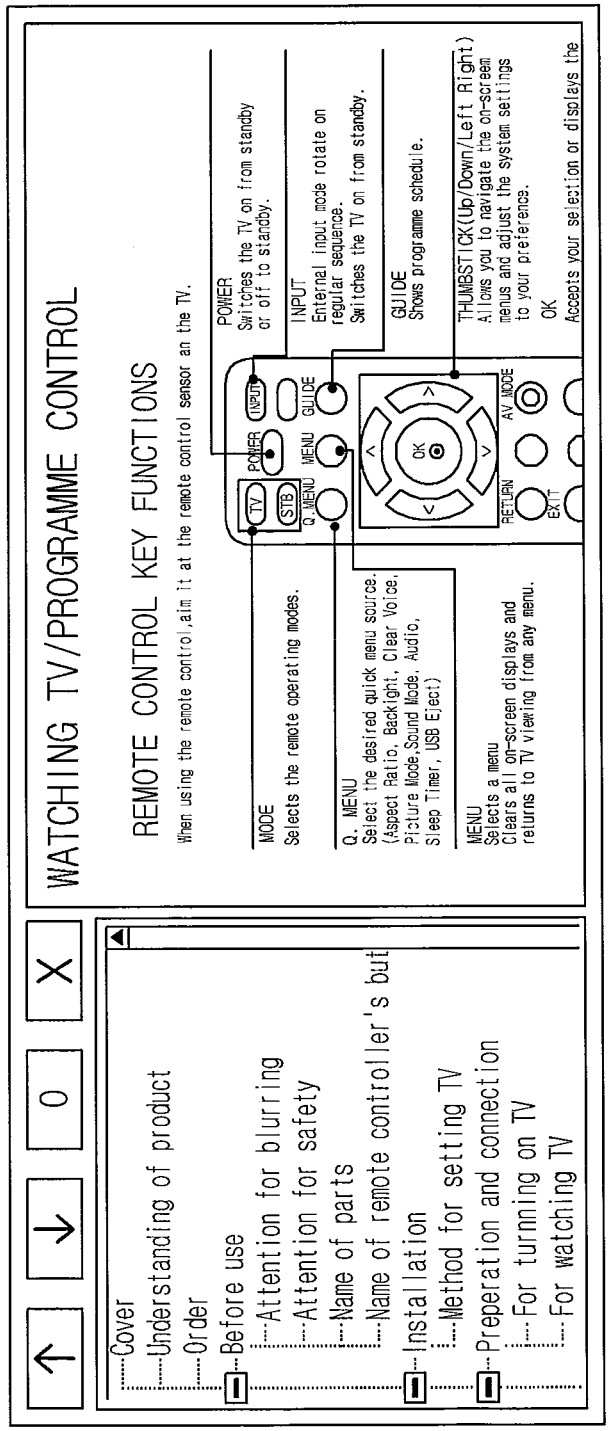
FIG. 5 is a diagram illustrating an embodiment of a screen for selectively displaying a plurality of manual pages in an image display device.

FIG. 5 is a diagram illustrating an embodiment of a screen for selectively displaying a plurality of manual pages in an image display device.

Referring to FIG. 5, a list of information about each of a plurality of manual pages corresponding to a function setting menu item selected by the user may be displayed.

For example, keywords corresponding to the manual pages may be displayed the left window of a display screen, and one of the manual pages may be selected by selecting one of the displayed keywords.

Specifically, the user may select one of the keywords corresponding to the manual pages by using an up/down navigation key displayed on the top left.

Meanwhile, an "O" key displayed on the top left is a key that allows the user to request the manual page corresponding to the corresponding keyword to be displayed on the left window. An "X" key is a key for closing the current manual screen.

When one of the manual pages is selected in the aforesaid way, the selected manual page may be displayed on the left window of the display screen as illustrated in FIG. 5.

Also, although not illustrated in the embodiment, a pop-up window indicating the presence/absence of a manual page or a pop-up window indicating whether to move to the corresponding manual page may be additionally displayed according to the input of the information key (Info Key).

The manual search method according to the embodiment can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network coupled computer systems so that the computer-readable code is stored and executed in a distributed fashion. Also, functional programs, codes, and code segments for accomplishing the embodiment can be easily construed by programmers skilled in the art to which the present invention pertains.

As described above, the present invention makes it possible for a user to easily search and read an operation manual of an image display device at a desired time.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for searching a manual in an image display device including a display unit, a key input unit and a control unit, comprising:
displaying, by the display unit, a plurality of menu items for setting functions of the image display device;
receiving, by the display unit, a user input for selecting one of the plurality of displayed menu items;
determining, by the control unit, whether an information key for the selected menu item is input from the user;
performing, by the control unit, a function corresponding to the selected menu item, when the information key is not input; and
displaying, by the display unit, at least one manual page corresponding to the selected menu item, when the information key is input, wherein,
if only one manual page corresponds to the selected menu item, the displaying of the manual page comprises displaying the manual page corresponding to the selected menu item on a specific region of a screen, and
wherein, if a plurality of manual pages corresponds to the selected menu item, the displaying of the manual page comprises:
displaying a list having a plurality of information entries, each information entry being a keyword for an image included in one of the plurality of manual pages;
receiving a user input for selecting one of the plurality of information entries; and
displaying the manual page corresponding to the selected information entry simultaneously with the list.

2. The method according to claim 1, wherein the receiving the user input for selecting one of the plurality of displayed menu items comprises:
receiving one of the plurality of menu items selected by the user; and
receiving a manual request for the selected menu item.

3. The method according to claim 1, further comprising:
determining whether the at least one manual page corresponding to the selected menu item is present; and
displaying an On Screen Display (OSD) screen indicating whether the at least one manual page is present.

4. The method according to claim 1, wherein the displaying of the at least one manual page comprises:
searching the manual stored in a memory of the image display device; and
reading the at least one page corresponding to the selected menu item among the searched manual from the memory.

5. The method according to claim 1, wherein the displaying of the at least one manual page comprises:
displaying respective keywords for the plurality of manual pages;
selecting one of the displayed keywords from the user; and
displaying the at least one manual page corresponding to the selected keyword.

6. The method according to claim 5, wherein the selecting of one of the displayed keywords comprises selecting one of the displayed keywords by the input of a navigation key by the user.

7. The method according to claim 1, wherein the displaying of the at least one manual page comprises dividing a display screen of the image display device into a first region and a second region, displaying the plurality of menu items on the first region, and displaying the at least one manual page on the second region.

8. The method according to claim 7, further comprising:
selecting one of the menu items displayed on the first region from the user; and
converting the at least manual page of the second region into at least one manual page corresponding to the selected menu item; and
displaying the at least one converted manual page.

9. A non-transitory computer-readable recording medium storing a program for executing the method of claim 1.

10. An image display device comprising:
a non-transitory memory unit for storing a manual including a plurality of manual pages;
a display unit for displaying at least one of the plurality of manual pages and menu items for setting functions of the image display device;
a key input unit for receiving a menu input for selecting one of the displayed menu items and an information key input from a user; and
a control unit for:
determining whether the information key for the selected menu item is input from the user,
performing a function corresponding to the selected menu item, when the information key is not input, and
searching at least one manual page corresponding to the selected menu item in response to the information key input, and
controlling the display unit to display the at least one searched manual page, wherein,
if only one manual page corresponds to the selected menu item, the display unit displays the one manual page corresponding to the selected menu item on a specific region of a screen, and if a plurality of manual pages corresponds to the selected menu item, the display unit displays a list having a plurality of entries on the screen, each entry being a keyword for an image included in one of the plurality of pages for receiving a user input for selecting one of the plurality of entries and displays the manual page corresponding to the selected entry simultaneously with the list.

11. The image display device according to claim 10, wherein the memory unit stores language data and at least an image corresponding to the at least one manual page.

12. The image display device according to claim 10, wherein the display unit displays the keywords respectively to the plurality of manual pages and displays the at least one manual page corresponding to one of the plurality of displayed keywords selected by the user.

13. The image display device according to claim 12, wherein the key input unit has navigation keys for selecting one of the plurality of displayed keywords from the user.

14. The image display device according to claim 10, wherein the key input unit has a separate key for inputting a manual request.

15. The image display device according to claim 10, wherein the display screen of the display unit is divided into a first region and a second region so that the plurality of menu items are displayed on the first region and the at least one manual page is displayed on the second region.

16. The image display device according to claim 10, wherein the display unit displays a pop-up window indicating whether to move to at least one corresponding manual page in response to a manual request.

\* \* \* \* \*